United States Patent [19]
Ban et al.

[11] Patent Number: 5,889,849
[45] Date of Patent: Mar. 30, 1999

[54] COMMON-CHANNEL MESSAGE CONVERSION METHOD FOR COMMUNICATION NETWORK INTERFACE BETWEEN EXCHANGE SYSTEMS

[75] Inventors: Dong-Soo Ban; Jung-Yul Park; Dong-Hyun Lee, all of Kyonggi-do; Rha Soh, Chollabuk-do, all of Rep. of Korea

[73] Assignee: Hyundai Electronics Industries Co., Ltd., Kyonggi-do, Rep. of Korea

[21] Appl. No.: 769,086

[22] Filed: Dec. 18, 1996

[30] Foreign Application Priority Data

Dec. 19, 1995 [KR] Rep. of Korea ............... 1995 52270
Mar. 29, 1996 [KR] Rep. of Korea ............... 1996 9235

[51] Int. Cl.[6] ............................................. H04M 7/00
[52] U.S. Cl. ................... 379/230; 379/230; 379/219; 455/433
[58] Field of Search ............................. 379/230, 34, 219, 379/220, 221, 229; 455/433, 432, 439

[56] References Cited

U.S. PATENT DOCUMENTS

| | | | |
|---|---|---|---|
| 5,048,081 | 9/1991 | Gavaras et al. | 379/221 |
| 5,420,916 | 5/1995 | Sekiguchi | 379/230 |
| 5,517,563 | 5/1996 | Norell | 379/230 |
| 5,550,913 | 8/1996 | McMaster et al. | 379/230 |
| 5,550,914 | 8/1996 | Clarke et al. | 379/230 |
| 5,592,530 | 1/1997 | Brockman et al. | 379/34 |
| 5,680,437 | 10/1997 | Segal | 379/230 |

*Primary Examiner*—Ahmad F. Matar
*Assistant Examiner*—Benny Q. Tieu
*Attorney, Agent, or Firm*—McAulay Nissen Goldberg Kiel & Hand, LLP

[57] ABSTRACT

An improved common-channel message conversion method for a communication network interface between exchange systems which is capable of directly interfacing a DCN network and AMPS network by converting different message formats of a common-channel signalling method of a DCN network and AMPS network in one exchange system and coinciding different parameter values and operation between hierarchical structures.

2 Claims, 9 Drawing Sheets

COMMON-CHANNEL MESSAGE CONVERSION METHOD FOR COMMUNICATION NETWORK INTERFACE BETWEEN EXCHANGE SYSTEMS

BACKGROUND OF THE INVENTION

1. Field of the Invention

The present invention relates to a common-channel message conversion method for a communication network interface between exchange systems, and in particular to an improved common-channel message conversion method for a communication network interface between exchange systems which makes it possible to convert a consultative committee international telegraph and telephone (CCITT) common-channel message format and an American national standards institute (ANSI) common-channel format of a signal message processor of a third signal message transmission level among hierarchical structures of a common-channel signal method so that a common-channel signal method can be interfaced between a digital communication network (DCN) which is implemented by the CCITT method and an advanced mobile phone service (AMPS) which is one of the analog communication network which is implemented by the ANSI signal method, for thus interfacing the DCN network and the AMPS network by using one exchange system.

2. Description of the Conventional Art

Figure 1:
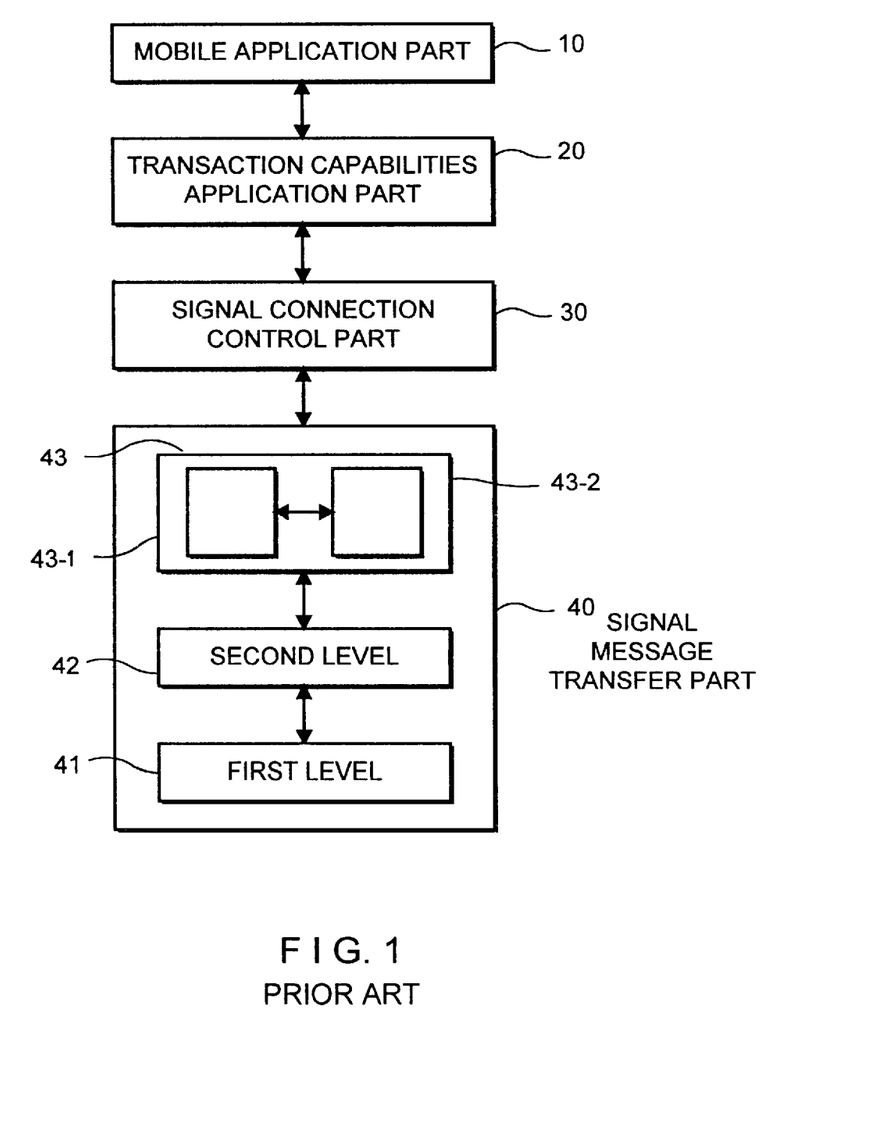
FIG. 1 is a diagram of a conventional common-channel signal message processor.

FIG. 1 is a diagram of a conventional common-channel signal message processor.

As shown therein, the conventional common-channel signal message processor includes a mobile application part (MAP) 10 which is connected for defining a mobile communication protocol which is necessary for a connection between a mobile communication subscriber and a providing service, a transition capabilities applicant part (TCAP) 20 for providing a protocol for transferring an information to a user in accordance with the definition of the MAP 10, a signal connection control part (SCCP) 30 for connecting a service system to a user in accordance with a mobile communication protocol from the TCAP 20, and a signal message transfer part (MTP) 40 for controlling a communication network which is necessary for a service providing of the SCCP 30.

The MTP 40 includes a first level 41 which defines a physical, electrical, and functional characteristic of a signal data link, a second level 42 which defines a procedure and function related to the signal message transfer operation through one signal data link, and a third level 43 having a signal network management unit 43-1 and a signal message processor 43-2, which third level 43 defines a procedure and function related to the message transfer operation between signal network signals.

Figure 2:
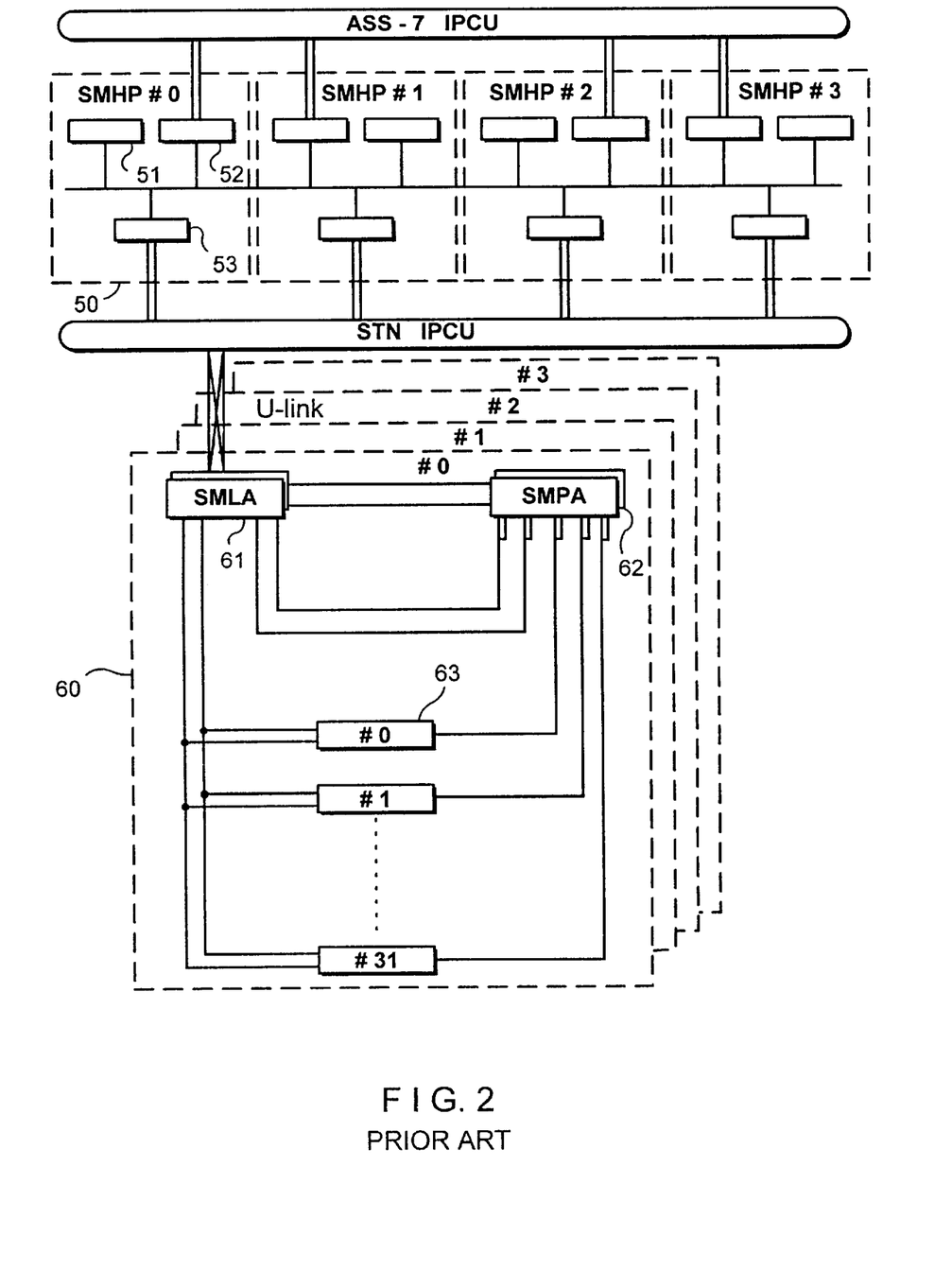
FIG. 2 is a diagram illustrating a conventional common-channel signal match exchange subsystem.

FIG. 2 is a diagram illustrating a conventional common-channel signal match exchange subsystem.

As shown therein, the common-channel signal match exchange subsystem (an Access Switching Subsystem: ASS-7) for generating a common-channel signal message flow includes a signalling message handling part (SMHP, #0 through #15) 50 for processing and managing the signal message in cooperation with the definition of a procedure and function related to the message transfer operation between network signals, a common-channel signal terminal group (STG, #0 through #3) 60 for processing a signal message in accordance with a procedure and function related to the signal message transfer operation through the signal data link connected to the SMHP 50 by a U-link, and a signal terminal (ST, #0 through #31) (not shown) separately connected to each of the STG 60 (#0 through #3).

The SMHP 50 (#0 through #15) is connected between an ASS-7 inter processor communication unit ASS-7 IPCU and a signal terminal network IPCU STN IPCU, and a processor communication control board assembly (PCCA) 51 for controlling the communication between processors, a main processor and memory management board assembly (MPMA) 52, and a signal bus interface board assembly (SBIA) 53 are connected to the main processor system bus (MPS-BUS). In addition, the STG 60 (#0 through #3) is connected to the STN IPCU by the U-link, and is connected to a signal terminal management logic board assembly (SMLA) 61 for managing the signal terminal, a signal terminal management processor assembly (SMPA) 62, the SMLA, and the SMPA by the signal data link. A signal terminal control board assembly (STCA, #0 through #31) for controlling the signal terminal is further connected.

The construction of the system is the same as the hierarchical structure of the common-channel signal message of the DCN network and the AMPS network.

Figure 3:
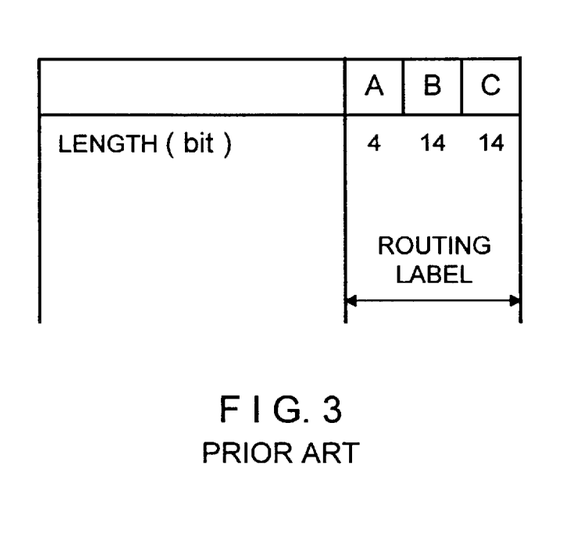
FIG. 3 is a diagram illustrating a routing label of a conventional CCITT signal method.
Figure 4:
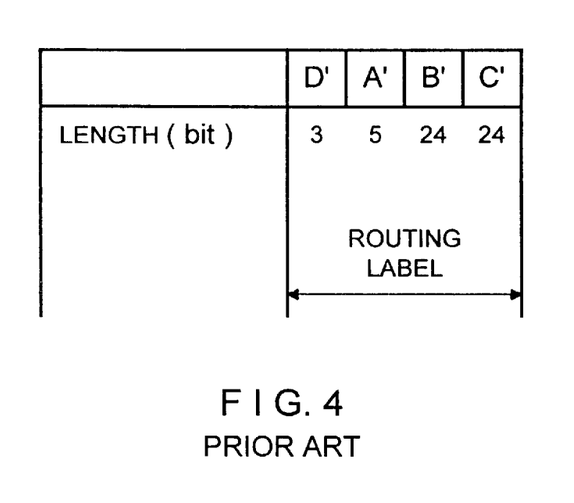
FIG. 4 is a diagram illustrating a routing label of a conventional ANSI signal method.

However, when comparing the routing label which is a parameter indicating the comprehensive name of each device of the DCN network and AMPS network, as shown in FIG. 3, the routing label of the local system based and CCITT based signal method is formed as follows: a signal link selection (SLS) "A" of four bits, a message originating point code (OPC) "B" of 14 bits, and a message destination point code (DPC) "C" of 14 bits are formed in four bytes. In addition, as shown in FIG. 4, a signal link selection code (SLS) "A'" of 5 bits, an OPC "B'" of 24 bits, a DPC "C'" of 24 bits, and an auxiliary bit "D" of 3 bits are formed in a routing label of the ANSI method and 7 bytes.

The DPC denotes a signal point code where a subscriber generated a message is positioned, and the OPC denotes an exchange signal point for finally processing the message. Here, there is a difference of the number of bits of the local system based and CCITT and ANSI signal method due to a difference of the number of the signal points.

In addition, the subsystem used in the DCN network and AMPS network will now be explained. For the DCN network, a plurality of subsystems, namely, the MAP is classified into a subscriber position register and a visitor position register, and for the AMPS network, one subsystem of the MAP is used.

The hierarchical structure of the DCN network and the AMPS network is the same; however, since the operation and data value are different, it is impossible to directly perform the interface therebetween.

SUMMARY OF THE INVENTION

Accordingly, it is an object of the present invention to provide a common-channel message conversion method for a communication network interface between exchange systems which overcomes the problems encountered in the conventional art.

It is another object of the present invention to provide an improved common-channel message conversion method for a communication network interface between exchange systems which is capable of directly interfacing a DCN network and AMPS network by converting different message formats of a common-channel signalling method of a DCN network and AMPS network in one exchange system and coinciding different parameter values and operation between hierarchical structures.

To achieve the above objects, in accordance with a first embodiment of the present invention, there is provided an improved common-channel message conversion method for a communication network interface between exchange systems which includes a first step for extracting a signal point from a destination address section of a signal connection controller of a CCITT message and changing the signal point of an ANSI signal point, storing the signal point in an ANSI format, changing a subsystem of the destination address to a mobile application unit, storing in the ANSI format, and judging whether a comprehensive name interpretation data of the destination address is included, a second step for storing the comprehensive name interpretation data in the ANSI format when the comprehensive name interpretation data is included in the first step, a third step for judging whether there is a signal point in a transferring address section of the CCITT message, extracting the signal point when there is the signal point therein, changing the signal point to an ANSI signal point, storing the signal point in an ANSI format, changing the subsystem of the transferring address to a mobile application part, storing in the ANSI formation, and judging whether a comprehensive name interpretation data of the transferring address is included, a fourth step for storing the comprehensive name interpretation data in the ANSI format when the comprehensive name interpretation data of the transferring address is included in the third step, and a fifth step for converting an address indication of the CCITT method into an address indication of the ANSI method, wherein a common-channel message conversion method for a communication network interface between exchange systems has an MAP for defining a mobile communication protocol which is used for a conversion between a mobile communication subscriber and a service provided, a TCAP for providing a protocol for transferring an information to a user in accordance with the definition of the MAP, an SCCP for providing a service to the user in accordance with the mobile communication protocol from the TCAP, a first level in which physical, electrical, and functional characteristics of a signal data link of the communication network which is necessary for a service providing of the SCCP are defined, a second level in which a procedure and a function related to a signal message transfer operation which is performed through one signal data link are defined, and a third level in which a procedure and a function related to a message transfer operation between signal network signal points of the signal network management unit and the signal message processor, wherein a DCN network and an AMPS network are processed in a hierarchical structure of an MIP which is managed through the above-described elements.

To achieve the above objects, in accordance with a second embodiment of the present invention, there is provided an improved common-channel message conversion method for a communication network interface between exchange systems which includes a first step for extracting a signal point when the signal point is in a destination address section of a signal connection controller of an ANSI message, changing the signal point to a CCITT signal point, storing the signal point in a CCITT format, and judging whether a subsystem of the destination address is included, a second step for judging whether a flag of the destination signal point is referred to an HLR when the subsystem of the destination address is included in the first step, a third step for storing the destination address subsystem as an HLR when it is judged to be the HLR in the second step, storing the same as the VLR when it is judged to be the VLR in the second step, and judging whether a comprehensive name interpretation data of the destination address is included, a fourth step for storing the comprehensive name interpretation data in the CCITT format when the comprehensive name interpretation data is included in the third step, a fifth step for extracting a signal point when the signal point is included in a transferring address section, changing the signal point to a CCITT signal point, storing the same in the CCITT format, and judging whether the subsystem of the transferring address is included, a sixth step for judging a flag of the transferring signal point is referred to an HLR when the subsystem of the transferring address is included in the fifth step, a seventh step for storing the transferring address subsystem as an HLR when it is judged to be the HLR in the sixth step, storing the same as a VLR when it is judged to be the VLR, and judging whether the comprehensive name interpretation data of the transferring address is included, and an eighth step for storing the comprehensive name interpretation data in the CCITT format when the comprehensive name interpretation data is included in the seventh step, and converting the address indication into the address indication of the CCITT method, wherein a common-channel message conversion method for a communication network interface between exchange systems has an MAP for defining a mobile communication protocol which is used for a conversion between a mobile communication subscriber and a service provided, a TCAP for providing a protocol for transferring an information to a user in accordance with the definition of the MAP, an SCCP for providing a service to the user in accordance with the mobile communication protocol from the TCAP, a first level in which physical, electrical, and functional characteristics of a signal data link of the communication network which is necessary for a service providing of the SCCP are defined, a second level in which a procedure and a function related to a signal message transfer operation which is performed through one signal data link are defined, and a third level in which a procedure and a function related to a message transfer operation between signal network signal points of the signal network management unit and the signal message processor, wherein a DCN network and an AMPS network are processed in a hierarchical structure of an MIP which is managed through the above-described elements.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 5:
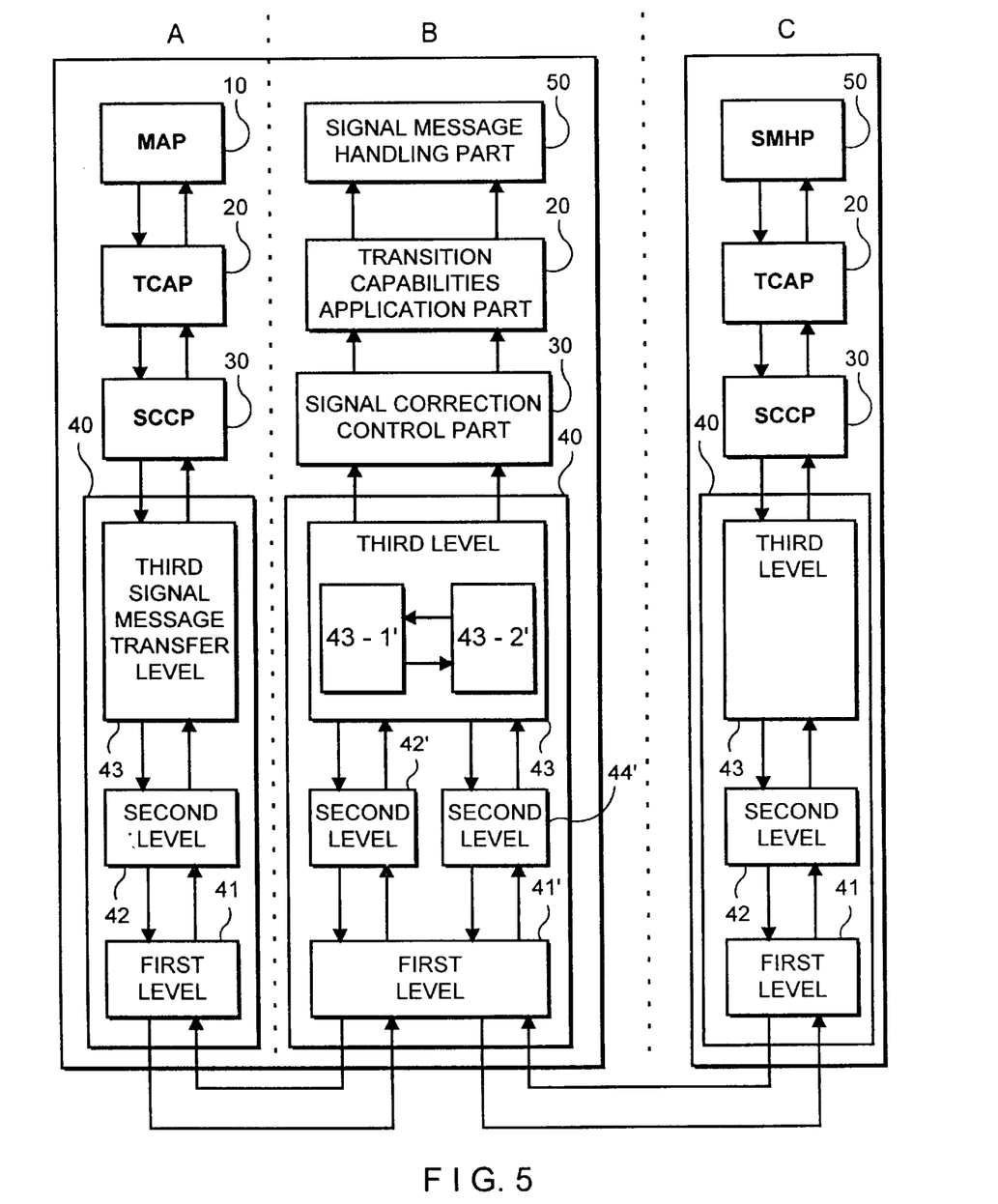
FIG. 5 is a flow chart of a signal message process for an exchange system according to the present invention.

FIG. 5 is a flow chart of a signal message process for an exchange system according to the present invention.

Section "A" as shown in FIG. 5 is a common-channel signal message processing block transferred from a DCN network, section "C" is a common-channel signal message processing block transferred from an AMPS network, and in section "B", the routine is processed in the identical hierarchical structure.

Namely, section "B" is an exchange system having signal message processing function units 43-1' and 43-2 for processing the common-channel signal message of the local system-based and CCITT signal method and the ANSI signal method, so that the conversion of the common-channel signal message format is performed this exchange system.

As shown in FIG. 5, there are provided an MAP 10 for defining a mobile communication protocol which is used for a connection between a mobile communication subscriber and a service providing system, a TCAP 20 for providing a protocol so as to transfer information to a user in accordance with the definition of the MAP 10, a SCCP 30 for providing a service in accordance with the mobile communication protocol from the TCAP 20, and an MTP 40 and a signal message processing unit 50 for managing the communication network which is used for providing service of the SCCP 30.

In addition, the MTP includes first, second and third signal message transfer levels 41, 42, and 43 with respect to the DCN network of section "A" and the AMPS network "C". Here, in the case of the exchange of section "B", 41', 42' and 43' denote first, second and third levels, respectively, and the third level 43' includes signal message processing function units 43-1' and 43-2'.

Namely, in the present invention, if the message received from the subscriber or visitor during the processing is transferred to another communication network of the common-channel signal method, the message must be converted to the message format for the local system-based and CCITT signal method or the ANSI signal method.

First, in the case that the message directed toward the DCN network and AMPS network is received, the message format must be converted for the AMPS network.

In more detail, when receiving the message transferred to the exchange system which is available for NO. 7 of the ANSI method based on the signal message processing unit 43', the SCCP 30, the TCAP 20, the MAP 10 which are the user's section of the exchange system including the exchange system of the CCITT method or ANSI⇆CCITT conversion function, the conversion must be performed with respect to the section "B", and then the message is transferred to the exchange system of the ANSI method.

The message received from the second level 42' of the CCITT signal method is converted to the message format of the ANSI signal method by the signal message processing unit 43-2 of the third level 43', and is transferred to the ANSI second level 44' for a transfer to the AMPS network, and the message transfer after the second level 44' is transferred to the DPC which is physically connected.

In addition, if the message from the AMPS network to the DCN network is received, the message format conversion must be performed so that the message can be transferred to the DCN network.

Namely, when the exchange system having the ANSI⇆CCITT conversion function is received from the exchange system which is available for supporting the ANSI method, so as to transfer the message transferred to the exchange system which is available for supporting the NO. 7 of the ANSI method with respect to the signal processing unit 43', the SCCP 30, the TCAP 20, and the MAP 10 which are the user's section of the exchange system, the message format must be converted from the ANSI format to the CCITT message format.

When the ANSI second level 44' of the AMPS network transfers the message of the ANSI common-channel message format from the AMPS network second level 42 of the section "C", the message is transferred to the signal message processing function unit 43-2 of the signal message transfer third level 43', and is converted to the local system-based and CCITT signal method in cooperation with the ANSI signal method.

The message converted to the CCITT signal method is transferred to the second level 42' of the CCITT signal method in order for the final destination point thereof to be verified and to be transferred to a corresponding signal point, and is transferred to the final destination point through the physical hierarchical structure connected to the corresponding signal point.

The conversion of the message format is performed by the SMHP and the STG as shown in FIG. 2.

Figure 6:
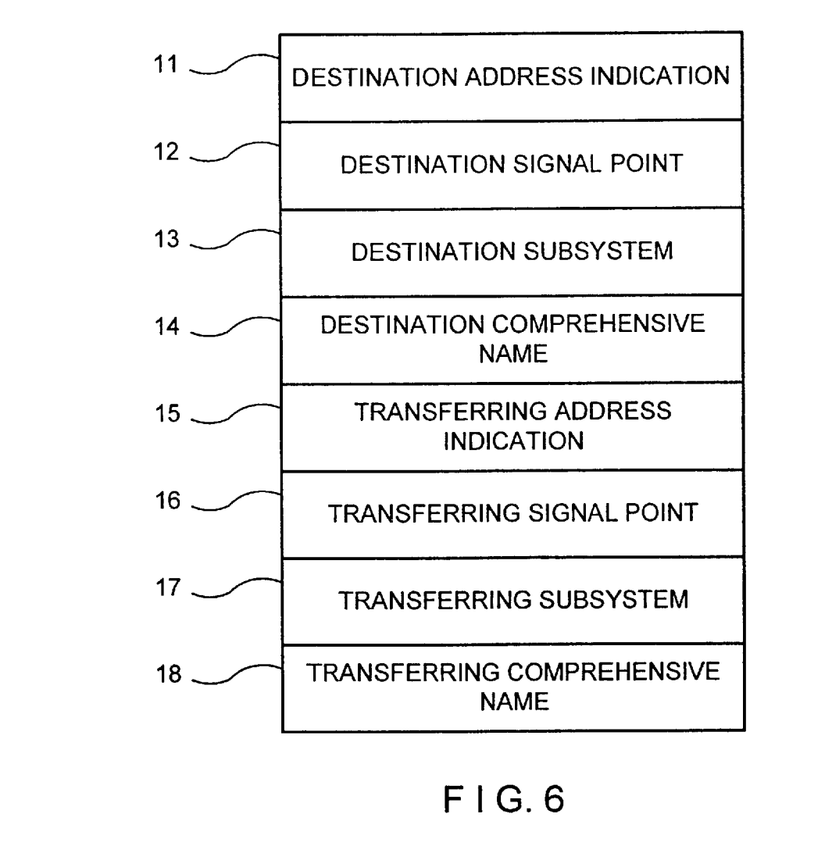
FIG. 6 is a diagram illustrating a format of a signal connection controller of a CCITT signal method according to the present invention.

FIG. 6 is a view illustrating the format of the SCCP 30 of the CCITT signal method. As shown therein, there are provided a destination address indication 11, a destination signal point 12, a destination subsystem 13, a comprehensive destination name 14, a transferring address indication 15, a transferring signal point 16, a transferring subsystem 17, and a comprehensive transferring name 18.

Figure 7:
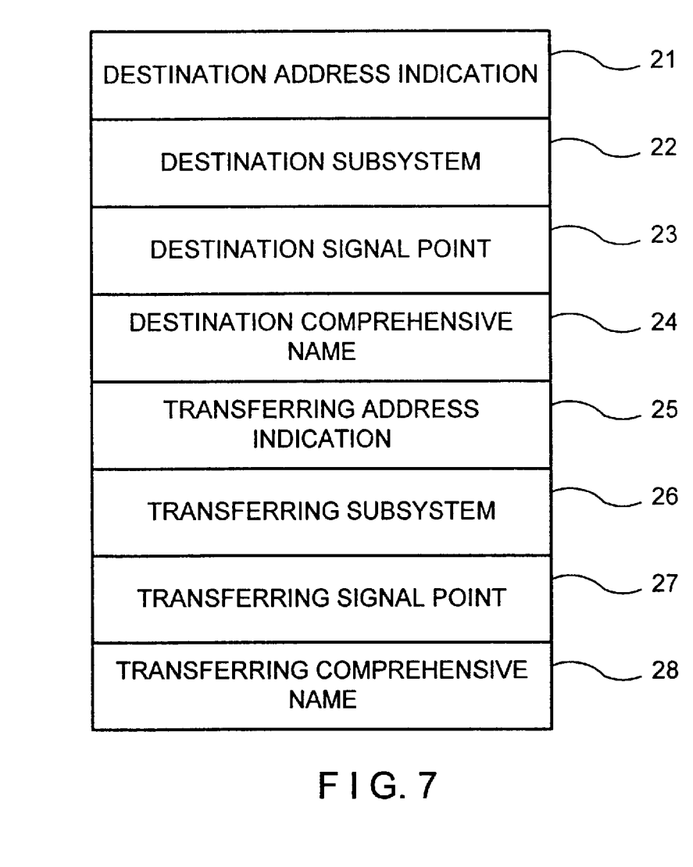
FIG. 7 is a diagram illustrating a format of a signal connection controller of an ANSI signal method according to the present invention.

FIG. 7 is a view illustrating the format of the SCCP 30 of the ANSI signal method which is operated in the AMPS network. As shown therein, there are provided a destination address display 21, a destination subsystem 22, a destination signal point 23, a comprehensive destination name 24, a transferring address indication 25, a transferring subsystem 26, a transferring signal point 27, and a comprehensive transferring name 28.

Here, the length of the comprehensive destination names 14 and 24 are variable.

The destination address indication 11 and the transferring address indication 15 of the signal connection controller 3 of the CCITT signal method is formed of one byte. Here, bit 0 denotes a signal point code, bit 1 denotes the number of the subsystem, bits 2 through 6 denote the number of the comprehensive name, bit 6 denotes a routing, and bit 7 denotes an auxiliary.

Namely, bit 0 denotes a non-including state of a signal point code in the case of 0, and bit 1 denote an including state of a signal point code in the case of 1, and bit 1 denotes a non-including state of a subsystem number in the case of 0, and bit 1 denotes an including state of the subsystem number.

In addition, bits 3 through 6 denote a non-including state of the comprehensive name number in the case of "0000", and "0010" includes an interpretation type of the comprehensive name number, and "0001" and "0011" through "1111" are auxiliary, and bit 7 denotes a routing based on the comprehensive name in the case of 0, and denotes a routing based on the signal point code and subsystem in the case of 1.

Since the destination address indication 21 and the transferring address indication 25 of the signal connection controller 3 of the ANSI signal method is formed of one byte, bit 0 denotes a subsystem number, bit 1 denotes a signal point code number, bits 2 through 6 denote a comprehensive name number, bit 6 denotes a routing, and bit 7 denotes a local network and international network.

Namely, bit 0 denotes a non-including state of the subsystem number in the case of 0, and denotes an including state of the subsystem number in the case of 1, and bit 0 denotes a non-including state of the signal point code in the case of 0, and denotes an including state of the signal point code in the case of 1.

In addition, bit 3 through 6 denote a non-including state of the comprehensive name number in the case of "0000", "0001" includes an interpretation type, number system, and coding method in the comprehensive name number, "0010" denotes an interpretation type of a comprehensive name number, and "0011" thorough "1111" are auxiliary, and bit 6 denotes a routing based on the comprehensive name in the case of 0, and denotes a routing based on the signal point code and subsystem in the case of 1, and bit 7 denotes a message from a signal connection controller interfacing with the international network in the case of 0, and denotes a message from the signal connection controller interfacing with the international network in the case of 1.

Figure 8A:
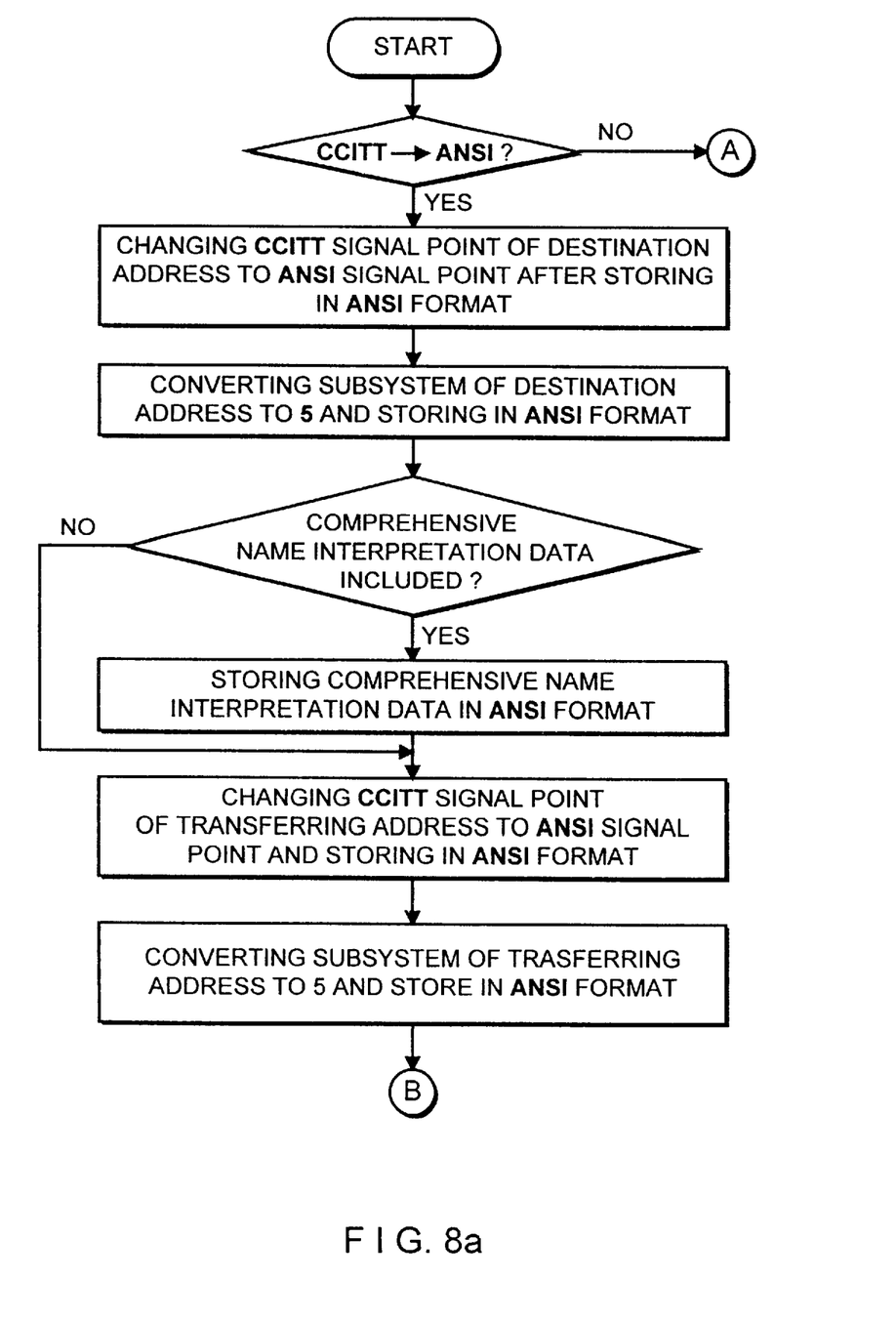
FIG. 8 composed of FIGS. 8a, 8b, and 8c, is a flow chart of a common-channel message conversion process for a communication network interface between exchange systems according to the present invention.
Figure 8B:
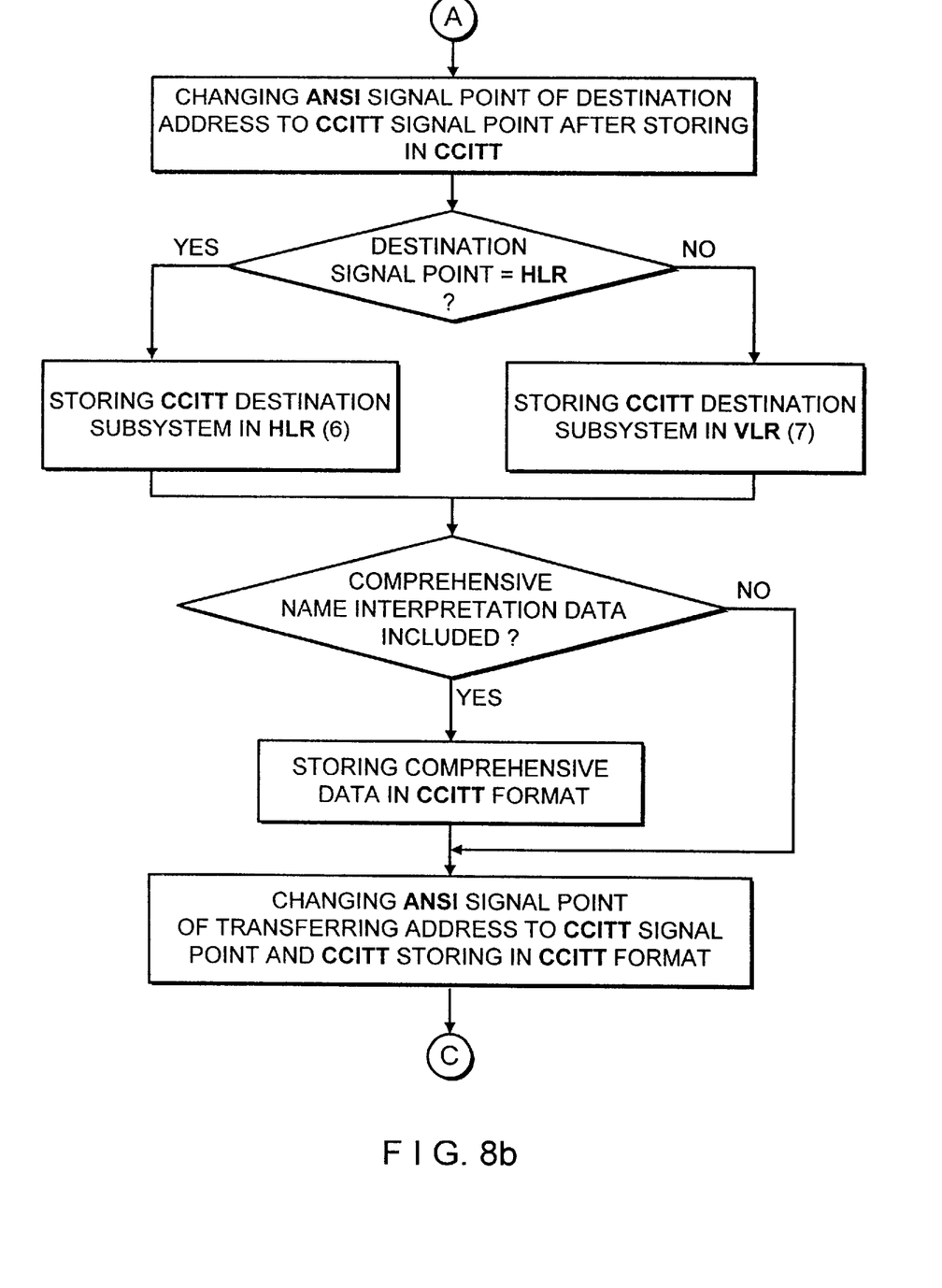
Figure 8C:
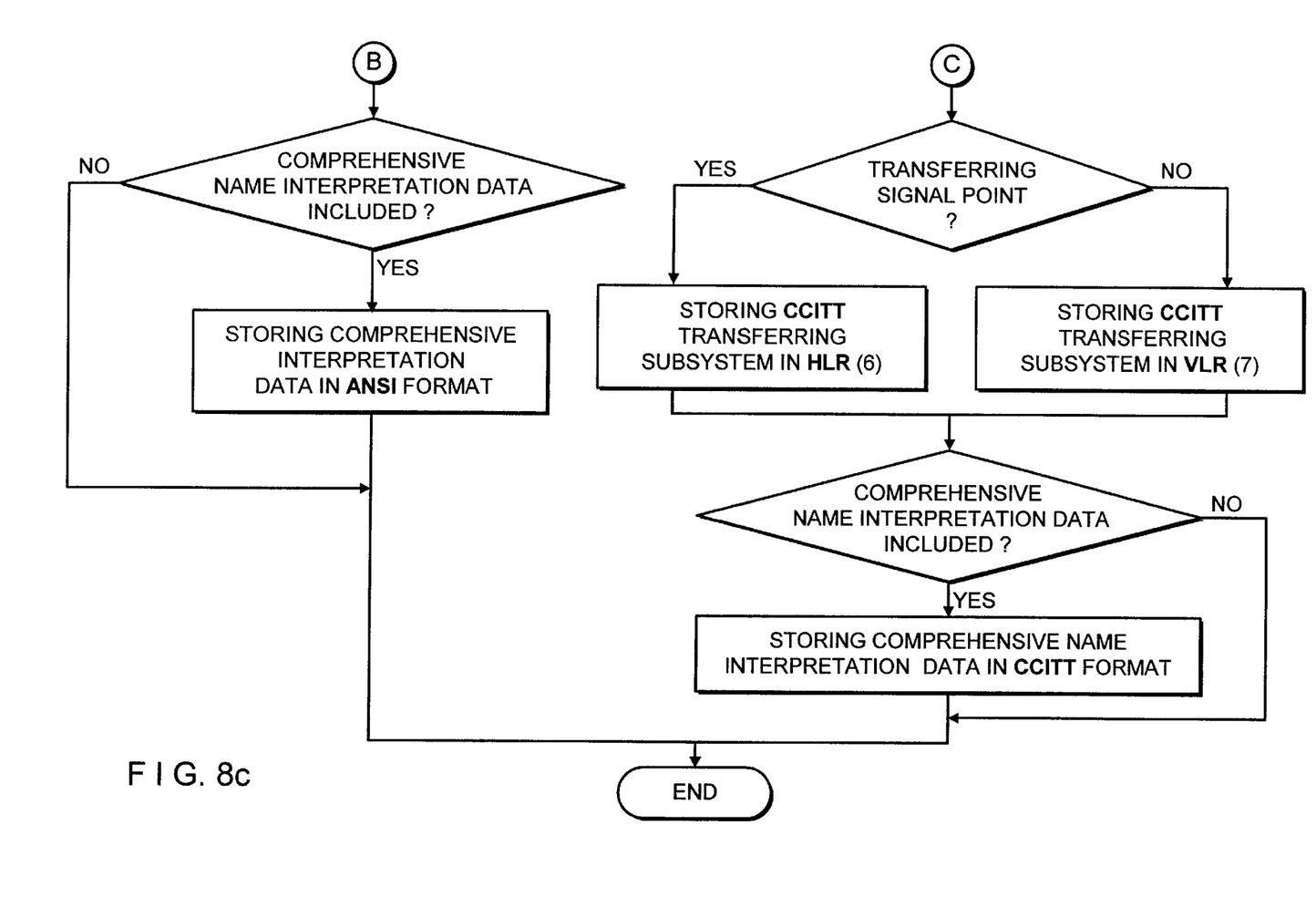

FIG. 8 is a flow chart explaining a common-channel message conversion method, in case of starting to convert the SCCP (30), it is judged first whether it is converted from CCPIT method into ANSI method.

If in the case of converting the message format from CCITT method into ANSI method, there is a signal point in the destination address section of the SCCP 30 of the CCITT message, this signal point is extracted, and is changed to an ANSI signal point, and is stored in the ANSI format, and then the subsystem of the destination address is changed to the moving application part, and is stored in the ANSI format, and it is judged whether there is a comprehensive name interpretation data of the destination address.

Here, if there is a comprehensive name interpretation data, the comprehensive name interpretation data is stored in the ANSI format.

Next, it is judged whether there is a signal point in the transferring address section of the CCITT message. If there is the signal point, the signal point is extracted, and if is changed to the ANSI signal point, and then stored in the ANSI format, and then the subsystem of the transferring address is changed to the moving application part, and is stored in the ANSI format, and then it is judged whether the comprehensive name interpretation data of the transferring address in included.

If the comprehensive name interpretation data of the transferring address in included therein, the comprehensive name interpretation data is stored in the ANSI format. Namely, after the data is stored in the comprehensive name interpretation data of the ANSI transferring address, the address indication is converted to be adaptable to the address indication of the ANSI method.

When converting the ANSI method into the CCITT method, if there is a signal point in the destination address section of the SCCP of the ANSI message, the signal point is extracted, and is changed to the CCITT signal point, and stored in the CCITT format. If there is a subsystem, it is judged whether the flag of the destination signal point is HLR. In the case of the HLR, the destination address subsystem is stored in the HLR, and in the case of VLR, the destination address subsystem is stored in the VLR.

Thereafter, it is judged whether the comprehensive name interpretation data of the destination address is included. If the comprehensive name interpretation data is included, the comprehensive name interpretation data is stored in the CCITT format. Namely, the data is stored in the CCITT transferring address comprehensive name interpretation data.

Next, when there is a signal point in the transferring address section, the signal point is extracted and is changed to the CCITT signal point, and then stored in the CCITT format. If there is a subsystem, it is judged whether the flag of the transferring signal point is an HLR. As a result, if the flag is the HLR, the transferring address subsystem is stored as the HLR, and if the flag is a VLR, the transferring address subsystem is stored as the VLR, and it is judged whether the comprehensive name interpretation data of the transferring address is included. If the comprehensive name interpretation data is included, the comprehensive name interpretation data is stored in the CCITT format, and the address indication is converted to a predetermined format adaptable to the address indication of the CCITT.

Figure 9:
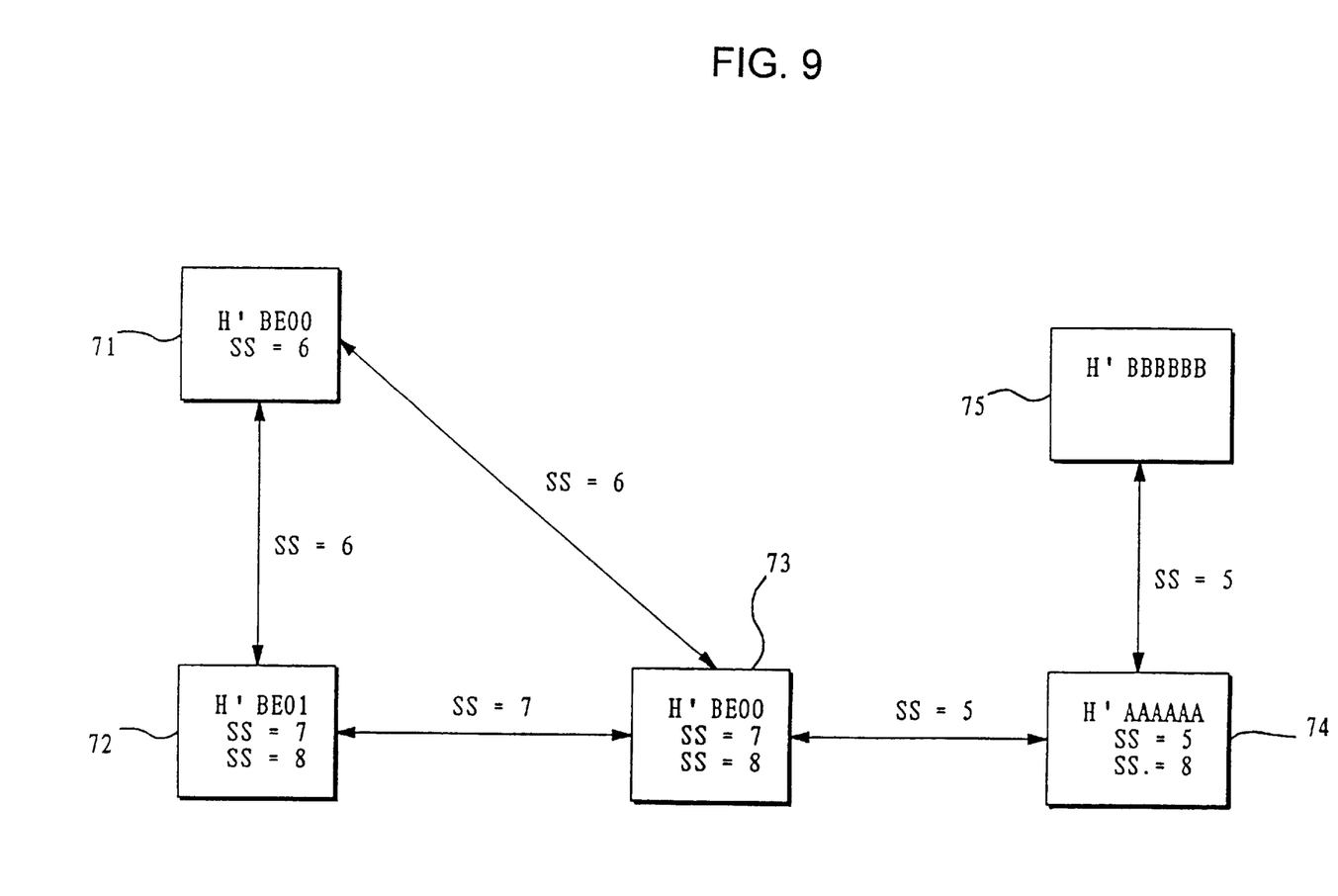
FIG. 9 is a diagram illustrating a subsystem interface process according to the present invention.

The above-described interface between the DCN network and AMPS network which is performed through the message conversion will now be explained in more detail with reference to FIG. 9.

Firstly, SS represents the subsystem numbers, for example, SS=5 represents MAP, SS=7 represents HLR, and SS=8 represents MSC respectively, wherein the subsystem indicates software blocks, and a plurality of softwares may be included on a signaling point.

Namely, MAP is a software block that is included in the AMPS exchange system to handle visitor subscribes and home subscribers, HLR is a software block for processing home subscribers per sectional telephone numbers as data is input from an external computer and the like of the exchange system, VLR is a software block that is included in the exchange system for processing position informed of the visitor subscriber, that is moved into a control region, and MSC is software block that is included in the exchange system and handles a function related to call processing.

Namely, the subsystem of the CCITT signal method which is operated in the DCN network includes a subscriber position register SS6 and a visitor position register SS7, and the subsystem of the ANSI signal method which is operated in the AMPS network is used as the mobile communication application unit SS5.

The destination subsystem (22) and the transferring subsystem (26) are SS=5 as shown in FIG. 7 in the case of AMPS, and the destination subsystem (13) and the transferring subsystem (17) are SS=6 or SS=7 as shown in FIG. 6 in the case of CCPIT.

Therefore, so as to convert the message of the common-channel signal method for an interface from the DCN network to the AMPS network, the subscriber position register SS6 and the visitor position register SS7 are classified into the subscriber position register SS6 and the mobile switch center SS8, and then when the subscriber position register SS6 is referred to the operation, a sixth subsystem is selected, and when the mobile switch center SS8 is referred to the operation, a seventh subsystem is selected, and then the data is inserted into a corresponding field and processed.

In addition, a mobile application unit SS5 is classified into the subscriber position register SS6 and the visitor position register SS7 in order for the common-channel message to be changed from the AMPS network to the DCN network.

When the subscriber position register SS6 is referred to the operation, the sixth subsystem is selected, and when the visitor position register SS7 is referred to the operation, the seventh subsystem is selected, so that the message format is converted.

The interface between the DCN network and AMPS network will now be explained in more detail.

First, during a transfer from the DCN network to the AMPS network, a message is transferred from H'BEOO of a subscriber position register 71 of the DCN network to H'BFOO of a mobile switch center 73.

The final destination point code is analyzed by the message processor of the mobile switching center 73. As a result, if the destination point code of a corresponding message is judged to be H'AAAAAA of the subscriber position register 75 of the AMPS network, a corresponding message is converted into the ANSI message format, and the value of the corresponding subsystem is allocated to 5, and the corresponding message is transferred to the subscriber position register 75 of the AMPS network through the mobile switch center 74 of the AMPS network.

In addition, the destination point code of the message received from the AMPS network is referred to H'BEOO of the subscriber position register 71 of the DCN network, a corresponding message is converted to the CCITT format, and the value of the subsystem is allocated to 6, and the message is transferred to the subscriber position register 71.

As described above, the common-channel message conversion method for a communication network interface between exchange systems is directed to additionally providing a function of converting the message format of the CCITT common-channel signal method to the ANSI common-channel message format and the CCITT common-channel message format to the second level signal message processor of the MTP among the common-channel signal message processing hierarchical structure having only a judgement, distribution and routing function, so that it is possible to directly interface the DCN network and AMPS network in one exchange system. In addition, since there is not a message exchange in the TACP, it is possible to use the function of the TCAP which is conventionally used. Furthermore, it is possible to significantly reduce the number of inter processor communication (IPC) between the internal processors in the mobile switching center by processing a part of conversion function of the SCCP and the TCAP by using the signal message processor of the third level of the MTP.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In a common-channel message conversion method for a communication network interface between exchange systems having a mobile application part for defining a mobile communication protocol which is used for a conversion between a mobile communication subscriber and a service provided, a transition capabilities application part for providing a protocol for transferring an information to a user in accordance with the definition of the mobile application part, a signal connection control part for providing a service to the user in accordance with the mobile communication protocol from the transition capabilities application part, a first level in which physical, electrical, and functional characteristics of a signal data link of the communication network which is necessary for a service providing the signal connection part are defined, a second level in which a procedure and a function related to a signal message transfer operation which is performed through one signal data link are defined, and a third level in which a procedure and a function related to a message transfer operation between signal network signal points of the signal network management unit and the signal message processor, wherein a data communication network and an advanced mobile phone service network are processed in a hierarchical structure of a message transfer part which is managed through the above-described elements, the improvements comprising the steps of:

a first step for extracting a signal point from a destination address section of a signal connection controller of a CCITT message and changing the signal point of an ANSI signal point, storing the signal point in an ANSI format, changing a subsystem of the destination address to a mobile application unit, storing in the ANSI format, and judging whether a comprehensive name interpretation data of the destination address is included;

a second step for storing the comprehensive name interpretation data in the ANSI format when the comprehensive name interpretation data is included in the first step;

a third step for judging whether there is a signal point in a transferring address section of the CCITT message, extracting the signal point when there is the signal point therein, changing the signal point to an ANSI signal point, storing the signal point in an ANSI format, changing the subsystem of the transferring address to a mobile application part, storing in the ANSI formation, and judging whether a comprehensive name interpretation data of the transferring address is included;

a fourth step for storing the comprehensive name interpretation data in the ANSI format when the comprehensive name interpretation data of the transferring address is included in the third step; and a fifth step for converting an address indication of the CCITT method into an address indication of the ANSI method.

2. In a common-channel message conversion method for a communication network interface between exchange systems having a mobile application part for defining a mobile communication protocol which is used for a conversion between a mobile communication subscriber and a service provided, a transition capabilities application part for providing a protocol for transferring an information to a user in accordance with the definition of the mobile application part, a signal connection control part for providing a service to the user in accordance with the mobile communication protocol from the transition capabilities application part, a first level in which physical, electrical, and functional characteristics of a signal data link of the communication network which is necessary for a service providing of the signal connection control part are defined, a second level in which a procedure and a function related to a signal message transfer operation which is performed through one signal data link are defined, and a third level in which a procedure and a function related to a message transfer operation between signal network signal points of the signal network management unit and the signal message processor, wherein a data communication network and an advanced mobile phone service network are processed in a hierarchical structure of a message transfer part which is managed through the above-described elements, the improvements comprising the steps of:

a first step for extracting a signal point when the signal point is in a destination address section of a signal connection controller of an ANSI message, changing the signal point to a CCITT signal point, storing the signal point in a CCITT format, and judging whether a subsystem of the destination address is included;

a second step for judging whether a flag of the destination signal point is referred to an HIR when the subsystem of the destination address is included in the first step;

a third step for storing the destination address subsystem as an HIR when it is judged to be the HLR in the second step, storing the same as the VLR when it is judged to be the VLR in the second step, and judging whether a comprehensive name interpretation data of the destination address is included;

a fourth step for storing the comprehensive name interpretation data in the CCITT format when the comprehensive name interpretation data is included in the third step;

a fifth step for extracting a signal point when the signal point is included in a transferring address section, changing the signal point to a CCITT signal point, storing the same in the CCITT format, and judging whether the subsystem of the transferring address is included;

a sixth step for judging a flag of the transferring signal point is referred to an HIR when the subsystem of the transferring address is included in the fifth step;

a seventh step for storing the transferring address subsystem as an HIR when it is judged to be the HIR in the sixth step, storing the same as a VLR when it is judged to be the VLR, and judging whether the comprehensive name interpretation data of the transferring address is included; and     an eighth step for storing the comprehensive name interpretation data in the CCITT format when the comprehensive name interpretation data is included in the seventh step, and converting the address indication into the address indication of the CCITT method.

\* \* \* \* \*